United States Patent [19]
Fuhrmann et al.

[11] 3,937,532
[45] Feb. 10, 1976

[54] NOVEL RECIRCULATING BEARING

[75] Inventors: Jorg Fuhrmann, Herzogenaurach; Hartmut Koschmieder, Erlangen; Georg Schaeffler, Herzogenaurach, all of Germany

[73] Assignee: Industriewerk Schaeffler OHG, Herzogenaurach, Germany

[22] Filed: Mar. 21, 1975

[21] Appl. No.: 560,952

[30] Foreign Application Priority Data

Apr. 3, 1974 Germany ............................ 2416198

[52] U.S. Cl. .................................................. 308/6 C
[51] Int. Cl.² .......................................... F16C 29/00
[58] Field of Search ............ 308/3.6, 6 R, 6 A, 6 B, 308/6 C, 193, 200, 202, 207 R, 212, 216, 217

[56] References Cited

UNITED STATES PATENTS

| | | | |
|---|---|---|---|
| 3,194,612 | 7/1965 | Striepe | 308/6 C |
| 3,802,752 | 4/1974 | Koschnieder et al. | 308/6 C |
| 3,836,211 | 9/1974 | Schneeberger | 308/6 R |

*Primary Examiner*—M. H. Wood, Jr.
*Assistant Examiner*—Gene A. Church
*Attorney, Agent, or Firm*—Hammond & Littell

[57] ABSTRACT

Novel recirculating roller bearings for the longitudinally moveable mounting of an element on a planar bearing surface comprising a bearing body with at least one straight race section, a return section parallel to the said race section, two preferably semicylindrical end deflecting sections connecting the ends of the parallel return section and race section to form a closed circulating track and a plurality of rollers in said circulating track, the improvement comprising retaining elements for successive pairs of rollers engaging circumferential grooves in the race edges.

9 Claims, 3 Drawing Figures

14 3 7 4 1 4 5 15 10 11 9 12 6 2 13 16

NOVEL RECIRCULATING BEARING

STATE OF THE ART

Recirculating roller bearing are already known in various embodiments and dimensions and are used for supporting machine parts which cover long linear displacement paths with reversal of the direction of motion as is the case, for example, in tool tables in grinding machines. The requirements for reliable operation and the life expectancy of the rollers can only be met, however, with the known embodiments under certain operating conditions or under severe conditions only with bearings up to a certain size.

With higher operating speeds and/or accelerations or when changing to bigger roller bearings of the above type, the known design has, on the one hand, the disadvantage that inertia forces from the radial acceleration in the deflecting sections and the linear acceleration and deceleration respectively in a reversal of the movement which increase disproportionally with the size, can brace the rollers and the interposed restraining elements in a manner to hinder the operation. Due to the resulting pressures, the rollers are hindered in their natural rolling movement and slide in the end zones of the race so that not only damages to the latter, but also to the rollers, are unavoidable which can lead to a premature failure of the bearings. On the other hand, it is necessary that the rollers represent with the bearing body an assembled single unit during shipping and in the unassembled state of the roller bearing to simplify handling during the assembly. In roller bearings of the known type, there is the difficulty, however, that the end play of the pitch circle of the ring of rollers and interposed retaining elements must be exactly tuned to ensure both a reliable retention of the rollers and a sufficiently large performance play.

OBJECTS OF THE INVENTION

It is an object of the invention to a recirculating bearing wherein the reaction of the interial forces existing in the deflecting sections and appearing during a reversal of motion direction does not effect the rollers.

It is a further object of the invention to provide a novel recirculating bearing provided with reliable roller retention means which can be economically made with large tolerances in the pitch circle end play.

These and other objects and advantages of the invention will become obvious from the following detailed description.

THE INVENTION

The novel recirculating roller bearing of the invention for the longitudinally moveable mounting of an element on a planar bearing surface is comprised of a bearing body with at least one straight race section, a return section parallel to the said race section, two preferably semi-cylindrical end deflecting sections connecting the ends of the parallel return section and race section to form a closed circulating track and a plurality of rollers in said circulating track secured by retaining elements between successive rollers, said retaining elements engaging circumferential grooves in the race shoulders or flanges, the improvement comprising successive pairs of rollers are arranged in a rigid retaining element to prevent the rollers from falling out and the successive retaining elements bear loosely on one another without a mutual connection.

In this construction, two successive rollers are arranged in a rigid retaining element which prevents the rollers from falling out, and successive retaining elements bearing are arranged loosely on one another without mutual connection. Such a design has the advantage that the inertia forces appearing during operation of the roller bearing are absorbed by the loose bearing retaining elements, and jamming of the rollers is avoided. The retaining elements of the invention also prevent the rollers from falling out so that elaborate tuning of the pitch circle end play is avoided.

In another embodiment of the invention, it is suggested that the rollers be held on all sides in the retaining element. Such a design has the particular advantage that each pair of rollers are already joined with the retaining element to form a unit during the assembly of such a roller bearing so that the assembly is substantially facilitated. A further expedient of the invention provides that the rollers have planar end faces and are guided with narrow play between parallel plane faces of the race borders in order to avoid skewing.

According to another embodiment of the invention, it is possible that the rollers are guided with narrow play in the retaining elements to avoid skewing, and that the retaining elements in turn engage with narrow play the circumferential grooves of the race borders to ensure that the rollers are guided exactly axes parallel even in the return section and in the deflecting sections respectively. This prevents canting of the rollers and thus sliding friction between the rollers and the race in all race sections, and particularly the entrance conditions into the load bearing race section are improved.

According to another feature of the invention, the circumferential region is preferably designed so that the rollers are guided at least in partial regions of the return section and/or the adjoining deflecting sections by the retaining elements with narrow play in a right angle to the respective race section. Due to this measure, the rollers always remain in contact with the race in a reversal of the movement which results in a further improvement of the entrance into the load bearing race section.

Another feature of the invention provides that the distance of roller axes of two rollers arranged in a retaining element is approximately equal to the distance of the roller axes of two adjacent rollers which are arranged in adjacent retaining elements bearing on one another in play free manner. Such an arrangement has the effect that there is always a constant number of rollers in the load bearing race section so that a substantially uniform spring constant and thus a smooth run of the part to be supported is obtained in this region.

According to another embodiment of the invention, the projections of the retaining elements engaging the circumferential grooves of the race borders have guide faces which cooperate with the circumferential grooves so that the rollers are lifted from the race before entering the deflecting section. Another embodiment of the invention provides that the rollers are substantially supported at least in the roller axes. This has the advantage that the rollers do not come in contact with the entrance edge of this section before entering the deflecting section, so that damage to this edge and to the rollers, which could lead to failure of the roller bearing is impossible.

According to another feature of the invention, the end faces of the retaining elements which are in contact with each other are provided with friction-reducing means. Such a design prevents damage to the races which could be caused by the metal abrasion on the faces of the retaining elements which are in contact with each other.

Referring now to the drawing.

Figure 1:
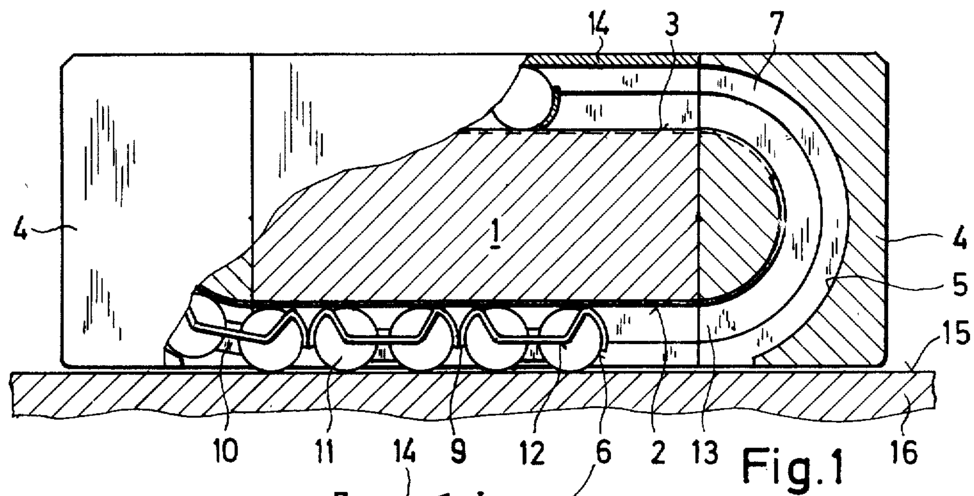
FIG. 1 is a partial longitudinal section through a roller bearing of the invention taken along with line I-I in FIG. 2.
Figure 2:
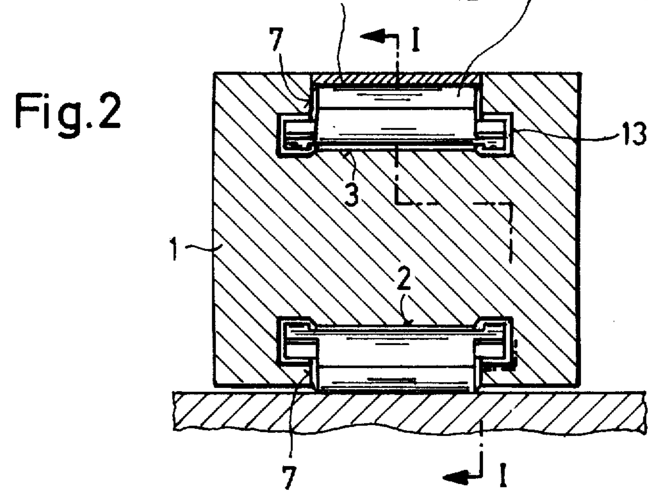
FIG. 2 is a cross section of the said bearing.

The roller bearing of FIGS. 1 and 2 consists of bearing body 1, which forms the supporting race section 2 and the return section 3, the side elements 4 with the semi-cylindrical deflecting sections 5 and which are connected in suitable manner with the bearing body 1, for example, by means of screws, and a plurality of cylindrical rollers 6 rolling therein which are guided at their end face on race borders 7.

Figure 3:
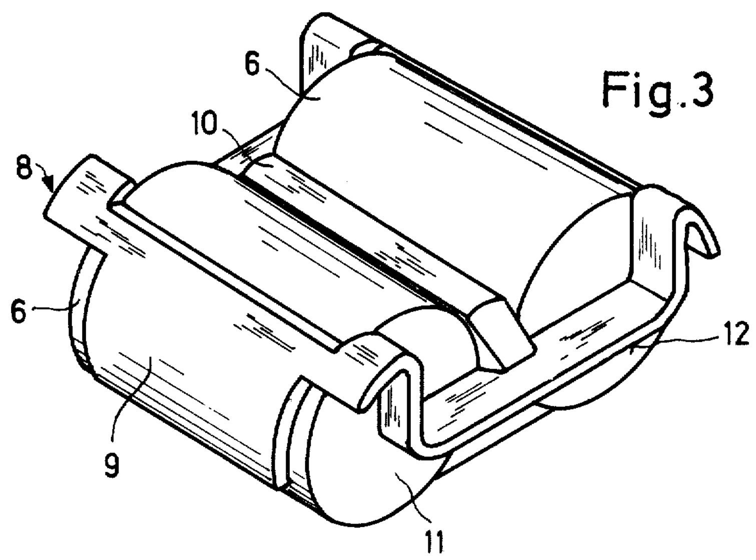
FIG. 3 illustrates a retaining element equipped with rollers taken in a perspective view.

As can be seen particularly from FIGS. 1 and 3, two successive rollers 6 are each arranged in a rigid retaining element 8, made for example, of sheet metal, which guides the rollers 6 by means of the lugs 9 adapted to the outside contour of the rollers 6 and a cross bar 10 arranged between the rollers 8 to keep the rollers parallel to each other and to prevent them from falling out. The successive retaining elements 8 bear loosely on each other in the area of lugs 9 without mutual connection and are held slidingly with stirrup-shaped guide faces 12 surmounting the end faces 11 of the rollers in grooves 13 provided in the bearing body 1 and the side elements 4 respectively. To guide the rollers 6 with narrow play in the area of the return section 3, a cover plate 14 is arranged in this region.

If inertia forces appear in a reversal of the direction of motion of the roller bearing moving in longitudinal direction on race 15 of element 16, these are absorbed by the retaining elements 8 without reaction on the rollers 6. Due to the axis-parallel guidance of the rollers to each other in a retaining element 8, the entrance conditions to the load bearing race are substantially improved when the rollers 6 move from one race section to another.

Various modification of the apparatus of the invention may be made without departing from the spirit or scope thereof and it is to be understood that the invention is not intended to be limited only as defined in the appended claims.

We claim:

1. A recirculating roller bearing for the longitudinally moveable mounting of an element on a planar bearing surface comprising a bearing body with at least one straight race section, a return section parallel to the said race section, two preferably semi-cylindrical end deflecting sections connecting the ends of the parallel return section and race section to form a closed circulating track and a plurality of rollers in said circulating track secured by retaining elements between successive rollers, said retaining elements engaging circumferential grooves in the race shoulders or flanges, the improvement comprising successive pairs of rollers are arranged in a rigid retaining element to prevent the rollers from falling out and the successive retaining elements bear loosely on one another without a mutual connection.

2. The bearing of claim 1 wherein the rollers are held on all sides by the retaining element.

3. The bearing of claim 1 wherein the rollers have planar end face and are guided with narrow play between plane parallel faces of the race edges to prevent skewing.

4. A bearing of claim 1 wherein the rollers are guided with narrow play in the retaining element to prevent crossing and the retaining elements are engaged circumferential grooves in the race with narrow lateral play.

5. A bearing of claim 1 wherein the rollers are guided at least in partial regions of the return section and/or the end sections by the retaining elements with narrow play at a right angle to the race section.

6. A bearing of claim 1 wherein the distance of the rollers axes of the pair of rollers in a retaining element is approximately equal to the distance of the roller axes of two adjacent rollers arranged in play free adjacent retaining elements bearing on one another.

7. A bearing of claim 1 wherein the retaining element projections engaging the circumferential grooves have guide faces which cooperate with the said grooves so that the rollers are lifted from the race when entering the deflecting end section.

8. A bearing of claim 7 wherein the said guide faces are arranged so that the rollers are substantially supported at least in the roller axes.

9. A bearing of claim 1 wherein the end faces of the retaining elements in contact with each other are provied with friction reducing means.

* * * * *